(12) United States Patent
Chang (10) Patent No.: US 7,607,200 B2
(45) Date of Patent: Oct. 27, 2009

(54) HINGE HAVING AUTO-RETURN AUTO-TURNING FUNCTIONS

(75) Inventor: Jui-Hung Chang, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 556 days.

(21) Appl. No.: 11/455,542

(22) Filed: Jun. 19, 2006

(65) Prior Publication Data

US 2007/0094842 A1    May 3, 2007

(30) Foreign Application Priority Data

Oct. 28, 2005    (TW) .............................. 94218635 U (51) Int. Cl.
*E05F 1/08* (2006.01)
(52) U.S. Cl. .............................. 16/303; 16/330; 16/374; 16/340
(58) Field of Classification Search ........... 16/337–339, 16/342, 330, 303, 374, 376, 377, 340; 361/680–683, 361/814; 455/90.3, 575.1, 575.3, 575.8; 379/433.12, 433.13; 348/373, 333.01, 333.06, 348/794; 200/11 R, 61.7, 16 A, 19.2
See application file for complete search history.

(56) References Cited

U.S. PATENT DOCUMENTS

| | | | |
|---|---|---|---|
| 5,075,517 A * | 12/1991 | Spanio | 200/16 A |
| 6,548,774 B1 * | 4/2003 | Bachle | 200/61.7 |
| 6,757,940 B2 * | 7/2004 | Lu et al. | 16/330 |
| 7,082,642 B2 * | 8/2006 | Su | 16/340 |
| 7,100,240 B2 * | 9/2006 | Amano | 16/303 |
| 7,187,539 B2 * | 3/2007 | Kim | 361/681 |
| 2004/0093690 A1 * | 5/2004 | Lu et al. | 16/330 |
| 2004/0216275 A1 * | 11/2004 | Hayashi | 16/303 |
| 2005/0155183 A1 * | 7/2005 | Lu et al. | 16/340 |
| 2007/0136992 A1 * | 6/2007 | Lu et al. | 16/330 |

\* cited by examiner

*Primary Examiner*—Chuck Y. Mah
(74) *Attorney, Agent, or Firm*—Guice Patents PLLC (57) ABSTRACT

A hinge formed of a shaft member, a spring member, a slide, a locating member, a mounting frame, and an end cap. When turning the mounting frame with the locating member relative to the slide and the shaft member within a predetermined angle, the mounting frame is returned or positioning in a position within an angle. When turning the mounting frame over the first predetermined angle, the sliding protrusions of the locating member are moved along the sliding protrusions of the slide, and the mounting frame is returned when the sliding protrusions of the locating member do not move over the peaks of the sliding protrusions of the slide, or the mounting frame is automatically turned relative to the shaft member through an angle when the sliding protrusions of the locating member are moved over the peaks of the sliding protrusions of the slide.

7 Claims, 9 Drawing Sheets

HINGE HAVING AUTO-RETURN AUTO-TURNING FUNCTIONS

BACKGROUND OF THE INVENTION

1. Field of the Invention

The present invention relates to hinges and more particularly, to such a hinge, which uses two reversed cam wheel components to achieve auto-return and auto-turning functions.

2. Description of the Related Art

A consumer electronic product with a lifting cover such as mobile computer, electronic dictionary, mobile video player, cell phone, etc., commonly uses a hinge to coupled the cover to the base member so that the cover can be opened from or closed on the base member. Therefore, the hinge also determines the quality level of the product. A good hinge allows positive positioning and must have means to limit the turning angle.

Following the development of live communication software with video transmission function, such as MSM Messenger, digital image pickup devices, such as web cam or PC cam and etc., have become popular. A web cam is connected to a personal computer through a COM.Port or USB so that the computer can transmit the images picked up by the web cam to other users through a network. Without the computer, the web cam cannot work. A mobile web cam can also be connected to a mobile computer for video communication. However, a mobile web cam is not the standard equipment of a mobile computer. A mobile computer user cannot make a video transmission without a web cam. There are manufacturers who provide mobile computers with built-in web cam, i.e., the web cam is mounted on the mid point of the top side of the display screen of the cover member of the mobile computer by means of a hinge. By means of the hinge, the web cam can be turned relative to the cover member to different angles. However, this design does not provide an auto-return function or auto-turning function within a certain angle. Further, when the web cam is turned over 180°, causing it to return picked up images to normal position when turned through 180°, the picked up images are reversed, bringing inconvenience to the user.

SUMMARY OF THE INVENTION

The present invention has been accomplished under the circumstances in view. It is the main object of the present invention to provide a hinge, which has auto-return and auto-turning functions and which uses an actuating member to trigger a control device.

To achieve this and other objects of the present invention and according to one aspect of the present invention, the hinge comprises a shaft member, a spring member, a slide, a mounting frame, a locating member, and an end cap. The shaft member comprises a shaft base, a shaft body extending from one end of the shaft base. The spring member is mounted on the shaft body of the shaft member and stopped against the shaft base. The slide is mounted on the shaft body of the shaft member for synchronous turning with the shaft member and stopped at one end of the spring member against the shaft base of the shaft member, having a plurality of wedge blocks disposed at one side thereof and a plurality of sliding grooves and sliding protrusions alternatively arranged around the shaft body of the shaft member. The mounting frame comprises an angled frame bar and a mounting lug at one side of the angled frame bar for mounting. The angled frame bar has an axle hole formed in the vertical end thereof and coupled to the shaft body of the shaft member. The locating member is fastened to the angled frame bar of the mounting frame around the shaft body of the shaft member and abutted against the slide for turning with the mounting frame relative to the slide and the shaft member. The locating member has a plurality of wedge-shaped grooves disposed at one side thereof for receiving the wedge blocks of the slide, and a plurality of sliding grooves and sliding protrusions alternatively arranged around the shaft body of the shaft member for acting against the sliding protrusions and sliding grooves of the slide respectively. The end cap is fastened to the shaft body of the shaft member to secure the shaft member to the mounting frame for allowing turning of the mounting frame with the locating member relative to the slide and the shaft member. When turning the mounting frame and the locating member relative to the slide and the shaft member within a first predetermined angle, the wedge-shaped grooves of the locating member are respectively worked relative to the wedge blocks of the slide, causing the mounting frame to be returned or positioning in a predetermined position. When turning the mounting frame and the locating member relative to the slide and the shaft member over the first predetermined angle, the sliding protrusions of the locating member are moved along the sliding protrusions of the slide, and the mounting frame is returned when the sliding protrusions of the locating member do not move over the peaks of the sliding protrusions of the slide. When the sliding protrusions of the locating member are moved over the peaks of the sliding protrusions of the slide, the mounting frame is automatically turned relative to the shaft member through an angle.

According to another aspect of the present invention, the shaft body of the shaft member has a coupling tip axially extending from a front end thereof remote from the shaft base and a locating groove extending around the periphery of the coupling tip. The end cap has a split center coupling hole fastened to the locating groove of the coupling tip of the shaft body of the shaft member.

According to still another aspect of the present invention, the shaft base of the shaft member has at least one mounting hole for fastening to an external object with a respective fastening member, and the mounting lug of the mounting frame has at least one mounting hole for fastening to an external object with a respective fastening member.

According to still another aspect of the present invention, the spring member can be a coil spring, a corrugated spring plate or a disk-like spring plate.

According to still another aspect of the present invention, the angled frame bar of the mounting frame has two pinholes at two sides of the axle hole, and the locating member has two pins respectively fastened to the pinholes of the angled frame bar of the mounting frame.

According to still another aspect of the present invention, the angled frame bar of the mounting frame has a stop block. The shaft body of the shaft member is mounted with a stop member. The stop member has a stop portion for stopping against one of two distal ends of the stop block of the angled frame bar of the mounting frame to limit the turning angle of the mounting frame relative to the shaft member.

According to still another aspect of the present invention, the hinge further comprises an actuating member fastened to the shaft body of the shaft member and turnable with the shaft member relative to the mounting frame. The actuating member has an actuating portion for trigging an external control device when the mounting frame is turned to a predetermined angle relative to the shaft member.

DETAILED DESCRIPTION OF THE PREFERRED EMBODIMENT

Figure 1:
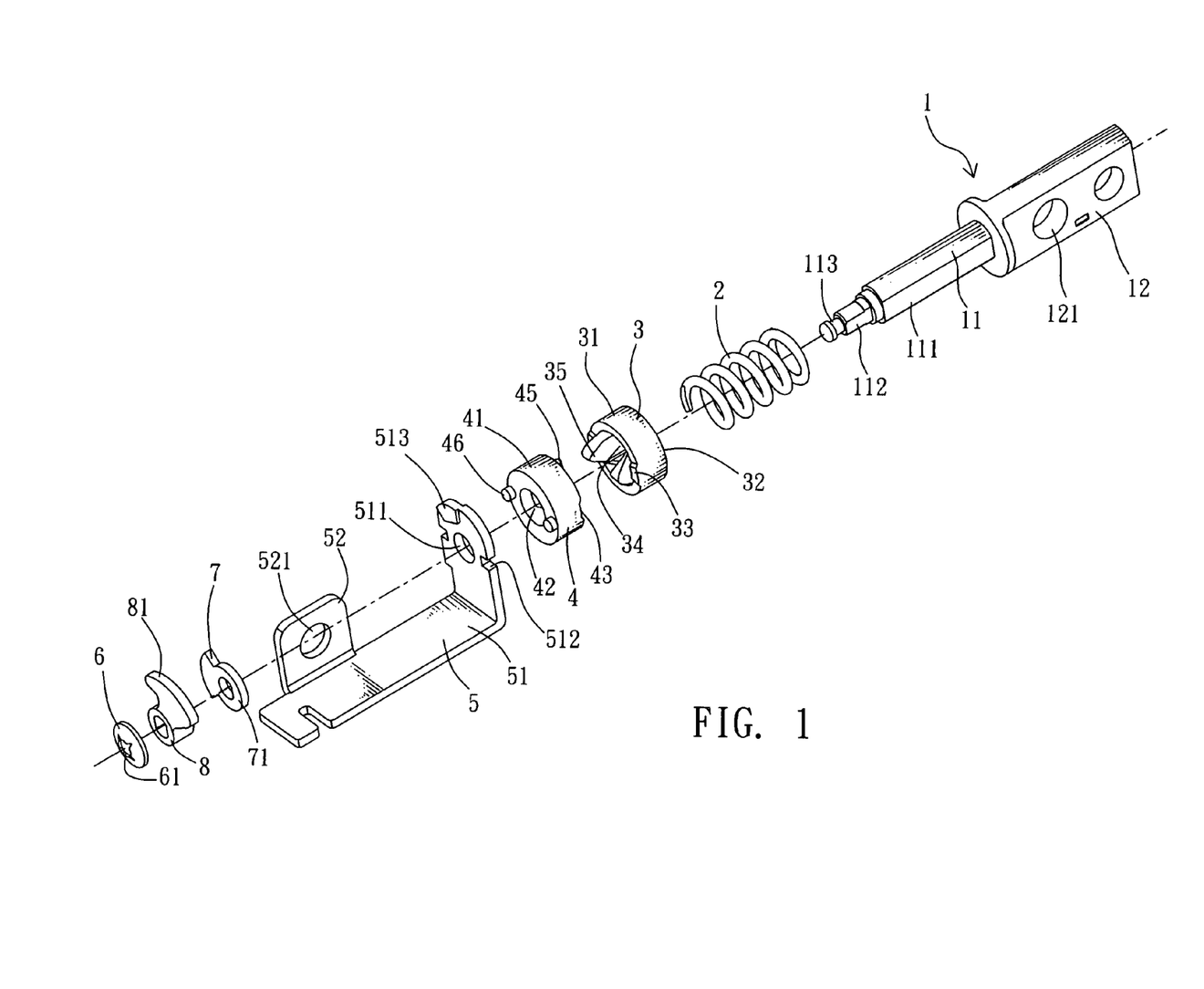
FIG. 1 is an exploded view of a hinge according to the present invention.
Figure 2:
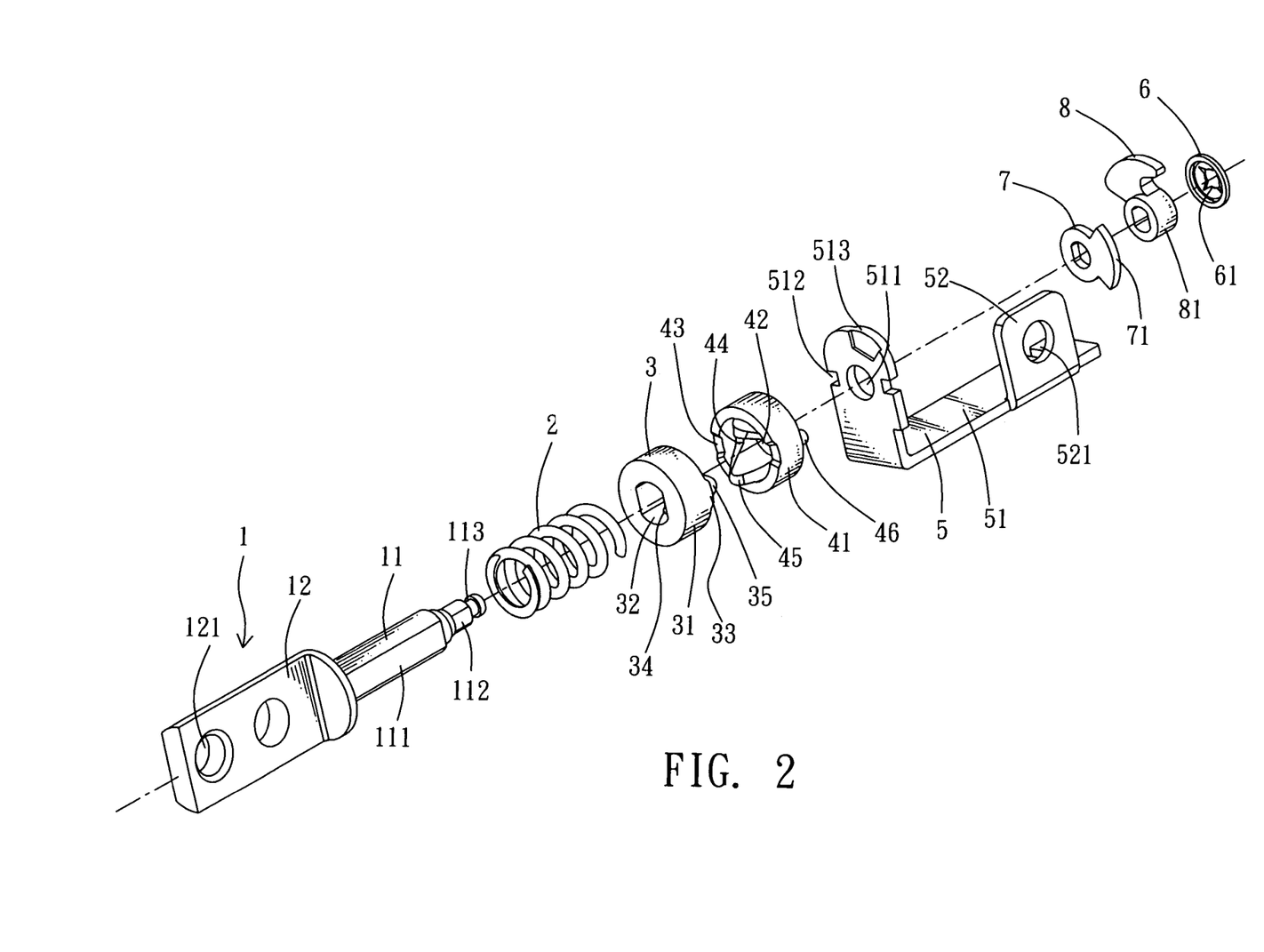
FIG. 2 is another exploded view of the hinge according to the present invention when viewed from another angle.
Figure 3:
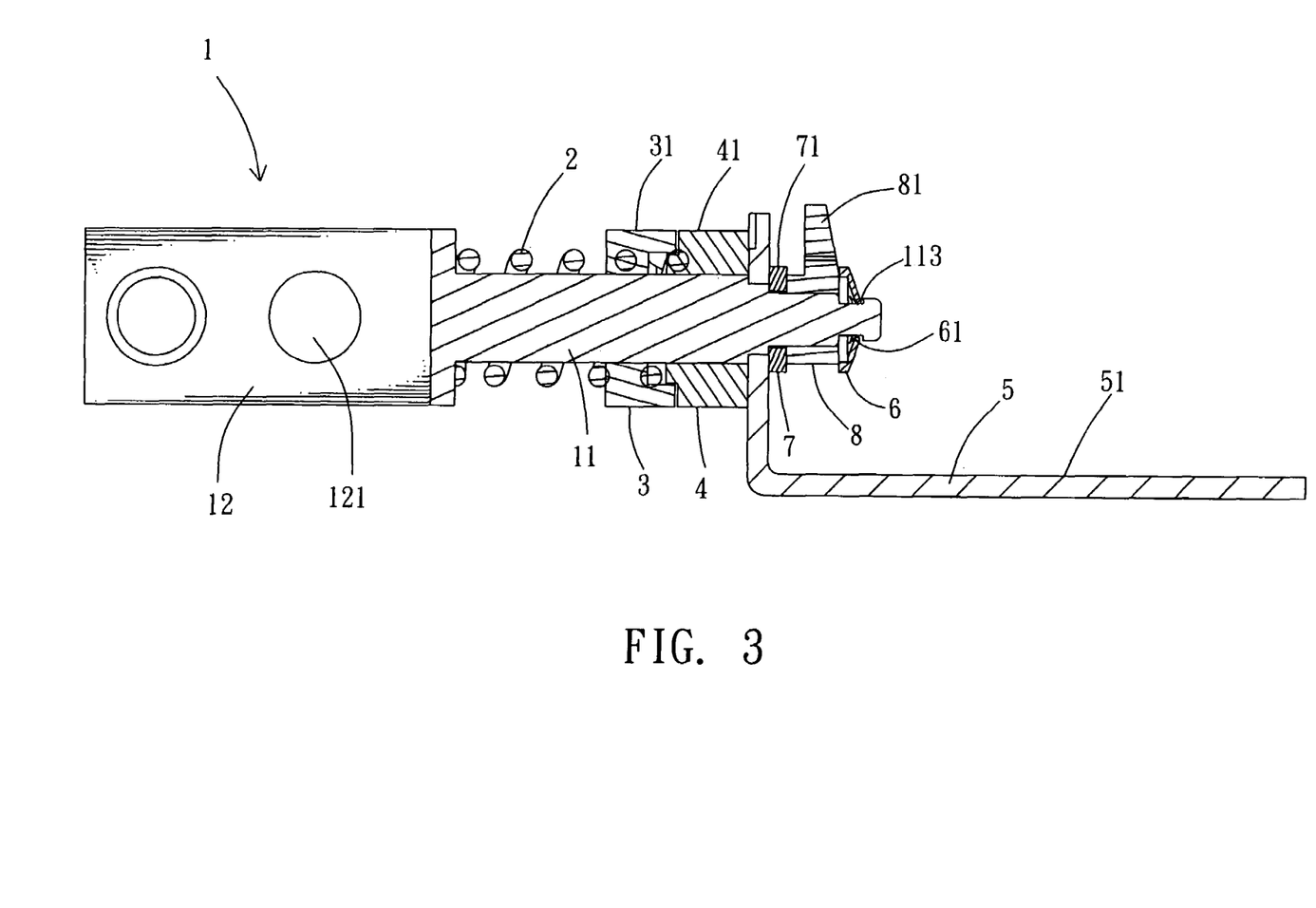
FIG. 3 is a sectional assembly view of the hinge according to the present invention.

Referring to FIGS. 1-3, a hinge in accordance with the present invention is shown comprised of a shaft member 1, a spring member 2, a slide 3, a locating member 4, a mounting frame 5, an end cap 6, a stop member 7, and an actuating member 8.

The shaft member 2 comprises a shaft base 12 and a shaft body 11 extending from one end of the shaft base 12. The shaft body 11 has a milling face 111 coupled to the slide 3 for allowing synchronous turning of the slide 3 with the shaft member 2. Further, the shaft body 11 has one end fixedly connected to the shaft base 12 and the other end terminating in a coupling tip 112 for supporting the stop member 7 and the actuating member 8. The coupling tip 112 has a locating groove 113 extending around the periphery for receiving the end cap 6. The shaft base 12 has a plurality of mounting holes 121 for the mounting of fastening members, for example, screws to affix the shaft member 1 to, for example, a cover member. Other mounting methods may be employed to affix the shaft member 1 to the cover member of the mobile electronic product.

The spring member 2 is mounted on the shaft body 11 of the shaft member 1 and stopped between the shaft base 12 of the shaft member 1 and one side of the slide 2, allowing movement of the slide 2 along the shaft body 11 of the shaft member 1. According to this embodiment, the spring member 2 is a metal spring coil. A corrugated or disk-like spring plate member may be used as a substitute.

The slide 3 and the locating member 4 are cam wheel components abutted together. The slide 3 has an outer race 31, a center axle hole 32 coupled to the shaft body 11 and fitting the at least one milling face 111 for synchronous turning with the shaft member 1, a plurality of wedge blocks 33 protruded from one side, and a plurality of sliding grooves 34 and sliding protrusions 35 alternatively arranged around the center axle hole 32 at one side.

The locating member 4 has an outer race 41, a center through hole 42 coupled to the shaft body 11 of the shaft member 1, a plurality of wedge-shaped grooves 43 formed on one side for receiving the wedge blocks 33, and a plurality of sliding grooves 44 and sliding protrusions 45 alternatively arranged around the center through hole 42 at one side corresponding to the sliding protrusions 35 and sliding grooves 34 of the slide 3. The relative action between the sliding grooves 44 and sliding protrusions 45 of the slide 4 and the sliding protrusions 35 and sliding grooves 34 of the slide 3 will be described further. Further, the locating member 4 is fixedly fastened to the mounting frame 5 with, for example, pins 46.

The mounting frame 5 comprises a L-shaped frame bar 51, and a mounting lug 52 fixedly connected to one side of the L-shaped frame bar 51 at right angles. The L-shaped frame bar 51 has an axle hole 511 for receiving the shaft body 11 of the shaft member 1, two pinholes 512 disposed at two sides relative to the axle hole 511 for the mounting of the pins 46 to secure the locating member 4, and a stop block 513 at one end near the axle hole 511. The mounting lug 52 has a mounting through hole 521 for the mounting of a fastening member, for example, a screw to affix the mounting frame 5 to, for example, a web cam.

The end cap 6 is capped on the coupling tip 112 of the shaft body 11 of the shaft member 1. The end cap 6 has a split center retaining hole 61 fastened to the locating groove 113 of the coupling tip 112 of the shaft body 11 of the shaft 1.

Further, the stop member 7 is fastened to the coupling tip 112 of the shaft body 11 of the shaft member 1 for synchronous turning with the shaft member 1 relative to the mounting frame 5, having a stop portion 71 for acting against the stop block 513 of the mounting frame 5 to limit the angle of turning of the shaft member 1 relative to the mounting frame 5, i.e., to define the start point and end point of the turning motion of the shaft member 1 relative to the mounting frame 5.

Further, the actuating member 8 is fastened to the coupling tip 112 of the shaft body 11 of the shaft member 1 and abutted against the stop member 7 for synchronous turning with the shaft member 1 relative to the mounting frame 5, having a protruding actuating portion 81. When the shaft member 1 is turned through a predetermined angle relative to the mounting frame 5, the protruding actuating portion 81 is forced to touch a control device, for example, a contact switch, so that the images picked up by the web cam can be controlled by the software program, preventing inversion of images.

Referring to FIGS. 1~3, during the assembly process of the hinge, the shaft body 11 of the shaft member 1 is inserted in proper order through the spring member 2, the slide 3, the locating member 4 and the axle hole 511 of the mounting frame 1, and then the stop member 7 and the actuating member 8 are fastened to the coupling tip 112 of the shaft body 11 of the shaft member 1, and then the end cap 6 is fastened to the locating groove 113 of the coupling tip 112 of the shaft member 1.

Figure 4A:
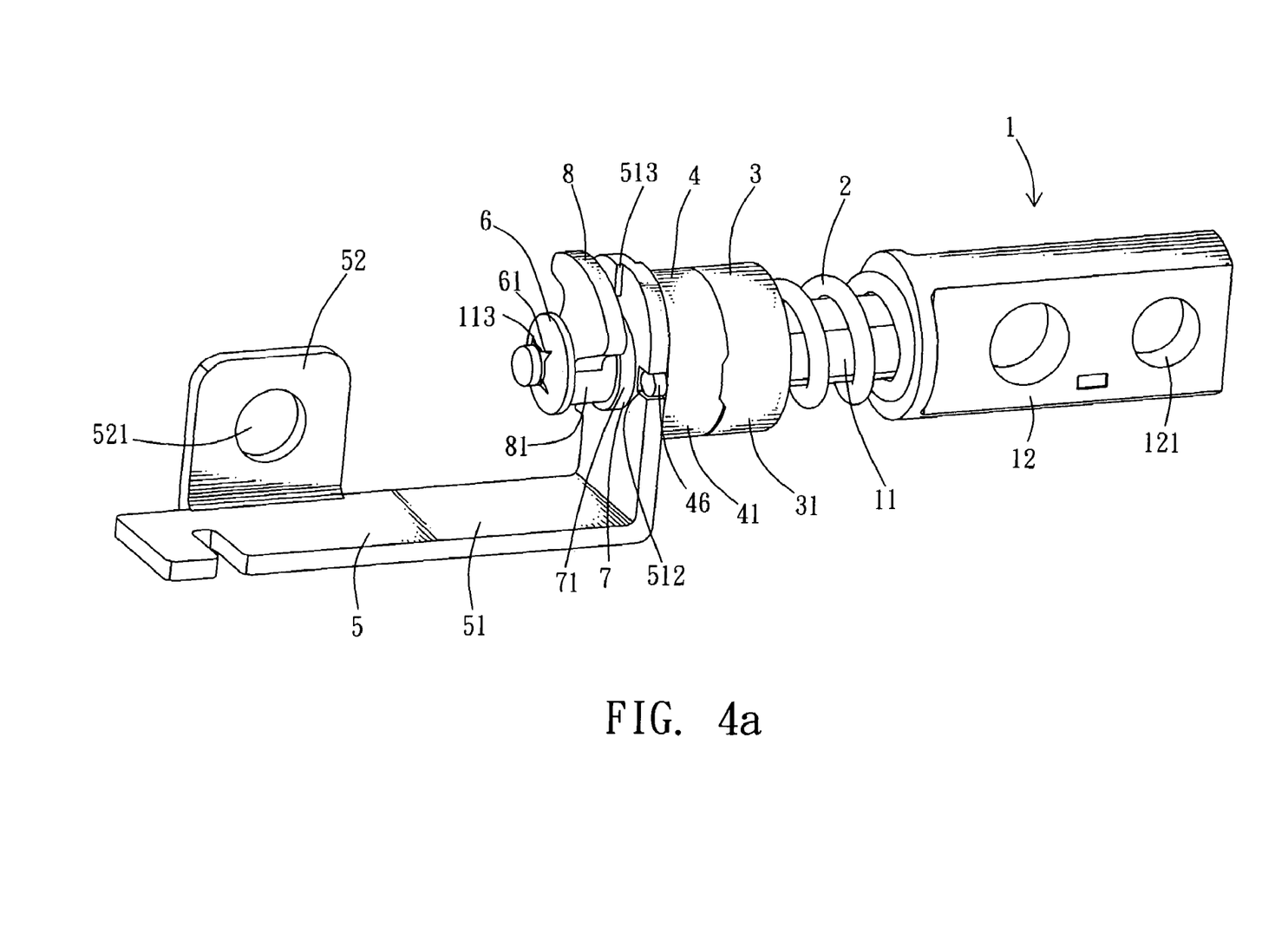
FIGS. 4a~4e are schematic drawings showing the operation of the hinge according to the present invention.

Referring to FIGS. 4a~4e and FIG. 5, the shaft member 1 is affixed to the cover member, and the web cam is fastened to the mounting frame 5 and turnable with the mounting frame 5 relative to the shaft member 1 and the cover member by an external force. The relative motion between the shaft member 1 and the mounting frame 5 is outlined hereinafter:

(1) As shown in FIG. 4a, when the web camera is turned with the mounting frame 5 relative to the shaft member 1 toward the user through 0~5°, the wedge-shaped grooves 43 of the locating member 4 are not moved over the wedge blocks 33 of the slide 3, therefore the wedge-shaped grooves 43 of the locating member 4 are automatically returned into engagement with the wedge blocks 33 of the slide 3, i.e., the mounting frame 5 is automatically returned to zero angle position where the stop block 513 of the mounting frame 5 is stopped against the rear side of the stop portion 71 of the stop member 7.

Figure 4B:
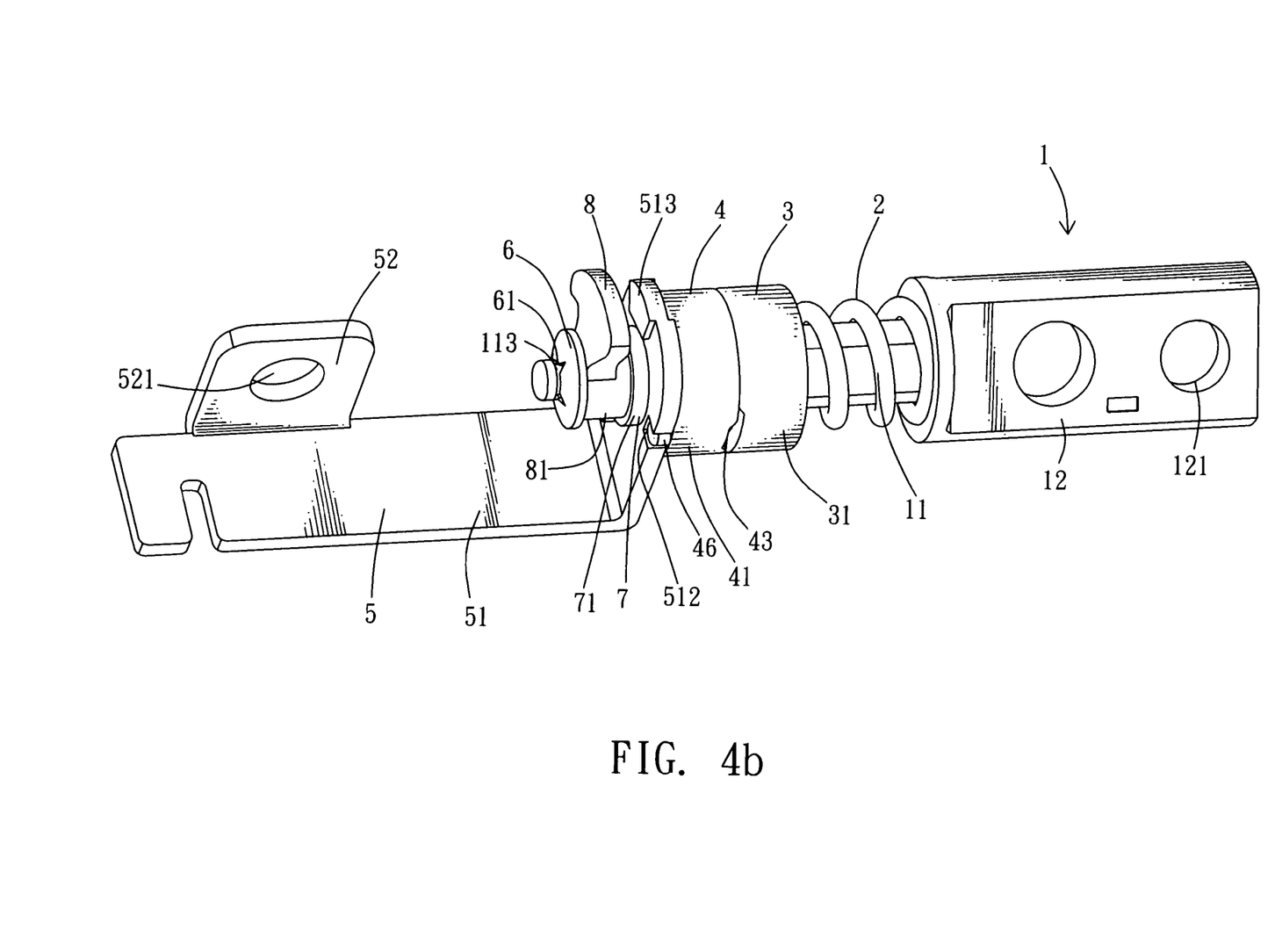

(2) As shown in FIG. 4b, when the web camera is turned with the mounting frame 5 relative to the shaft member 1 toward the user over 5°, the slide 3 is forced to compress the spring member 2 against the shaft base 12 of the shaft 1, at this time the wedge-shaped grooves 43 of the locating member 4 are respectively moved over the wedge blocks 3 of the slide 3, therefore the mounting frame 5 can be turned with the locating member 4 relative to the slide 3 and the shaft member 1 within 5~45° and positioned in any position within this range of angle.

Figure 4C:
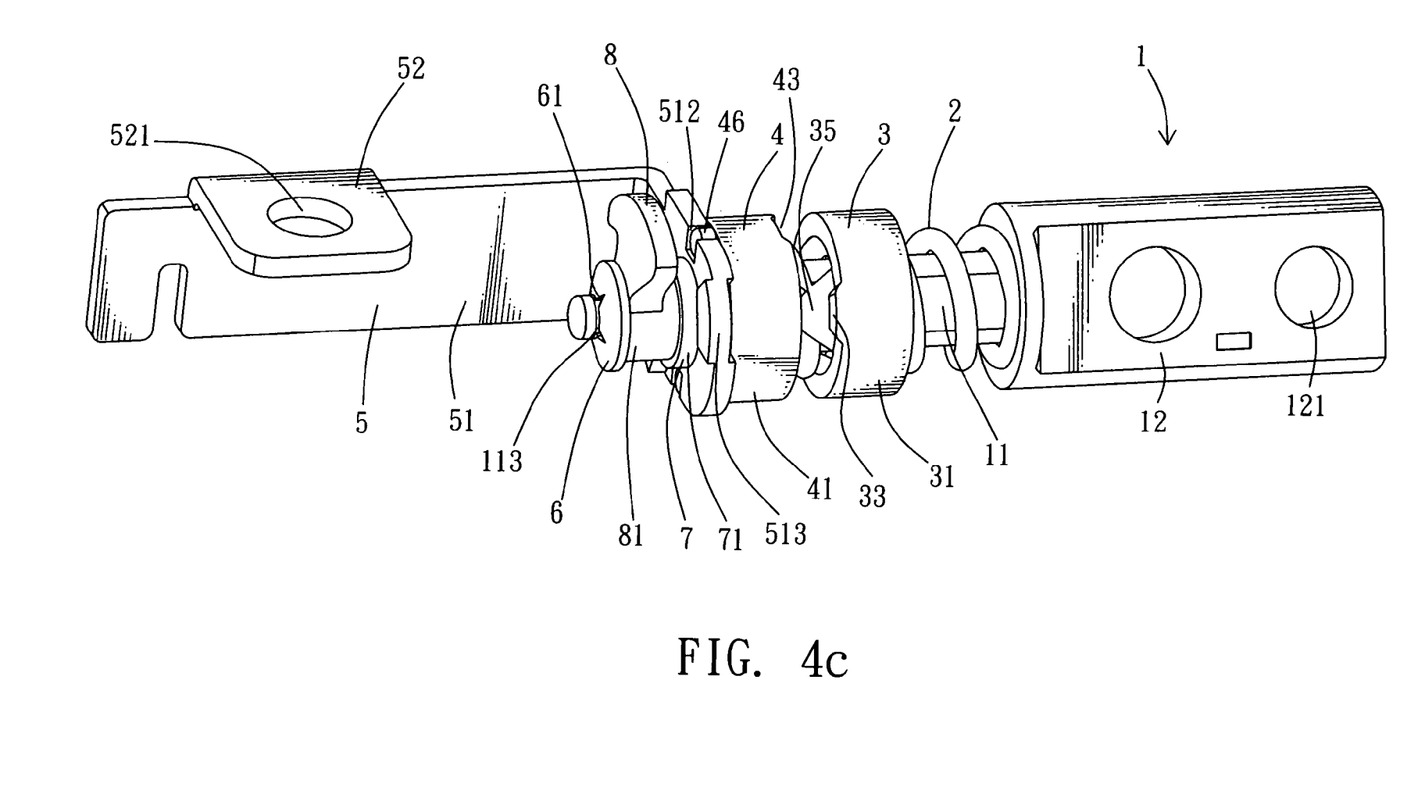

(3) As shown in FIG. 4c, when the web camera is turned with the mounting frame 5 relative to the shaft member 1 toward the user through 45~180°, the slide 3 is forced to compress the spring member 2 against the shaft base 12 of the shaft member 1 further. At this time, the sliding protrusions 45 of the locating member 4 are moved along the sliding protrusions 35 of the slide 3. When the sliding protrusions 45 of the locating member 4 are moved over the peaks of the sliding protrusions 35 of the slide 3 (about 112.5°), the mounting frame 5 is automatically turned to 180° position (see FIG. 4d). If the sliding protrusions 45 of the locating member 4 cannot be moved over the peaks of the sliding protrusions 35 of the slide 3 (about 112.5°), the mounting frame 5 is automatically returned to 45° position (see FIG. 4c). At this time, the actuating portion 81 of the actuating member 8 is forced to trigger the contact switch, preventing inversion of the images picked up by the web camera.

Figure 4D:
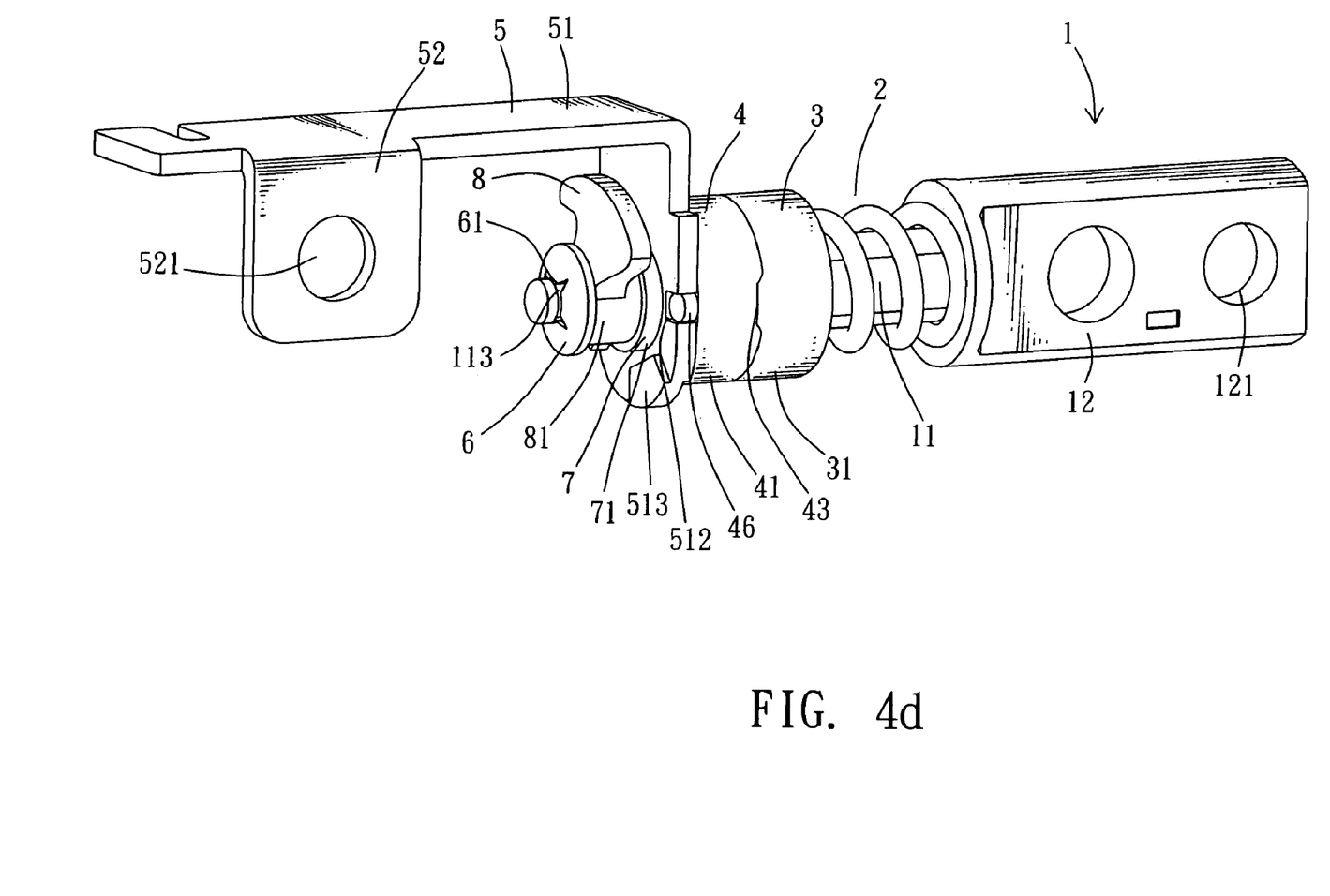

(4) As shown in FIG. 4d, when the web camera is turned with the mounting frame 5 relative to the shaft member 1 toward the user through 180~185°, the wedge-shaped grooves 43 of the locating member 4 are not moved over the wedge blocks 3 of the slide 3, therefore the wedge-shaped grooves 43 of the locating member 4 are automatically returned into engagement with the wedge blocks 33 of the slide 3, i.e., the mounting frame 5 is automatically returned to 180° position.

Figure 4E:
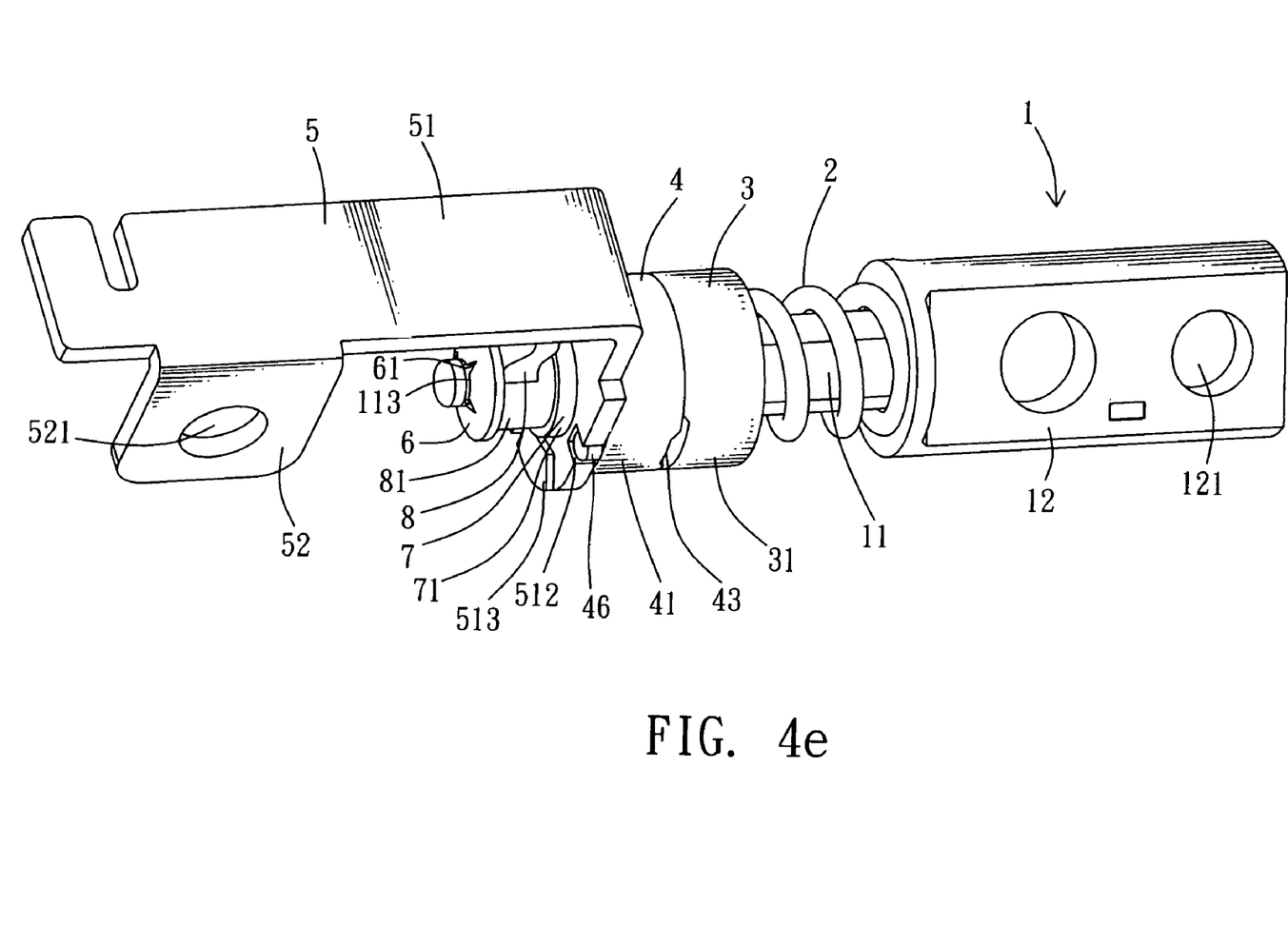
Figure 5:
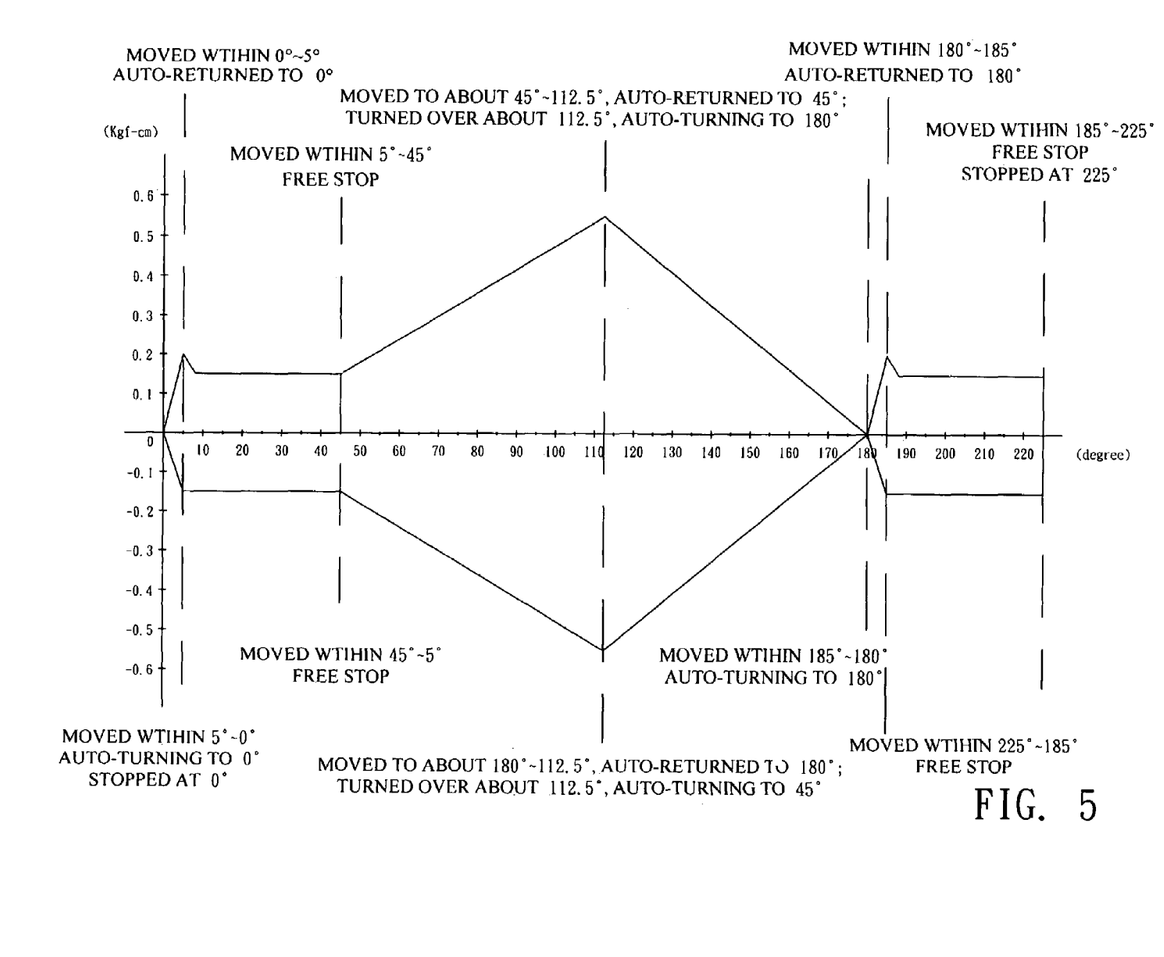
FIG. 5 illustrates the variation of torsional force of the hinge at different turning strokes according to the present invention.

(5) As shown in FIG. 4e, when the web camera is turned with the mounting frame 5 relative to the shaft member 1 toward the user through 185~225°, the slide 3 is forced to compress the spring member 2 against the shaft base 12 of the shaft member 1 slightly. At this time, the wedge-shaped grooves 43 of the locating member 4 are moved over the wedge blocks 33 of the slide 3, therefore the mounting frame 5 can be turned with the locating member 4 relative to the slide 3 and the shaft member 1 through 185~225° and positioned in any position within this range of angle. When turned to 225°, the stop block 513 of the mounting frame 5 is stopped against the front side of the stop portion 71 of the stop member 7.

(6) When receiving the web cam (mounting frame 5), reverse the aforesaid steps, i.e., perform the steps in the order of (5)~(1).

As indicated above, the invention uses two reversed cam wheel components and keeps them abutted against each other to achieve special hinge functions. This special design of hinge is practical for use in any electronic products having light, thin, short and small characteristics, for example, digital image pickup devices.

A prototype of hinge has been constructed with the features of FIGS. 1~5. The hinge functions smoothly to provide all of the features discussed earlier.

Although a particular embodiment of the invention has been described in detail for purposes of illustration, various modifications and enhancements may be made without departing from the spirit and scope of the invention.

What the invention claimed is:

1. A hinge comprising:
    a shaft member, said shaft member comprising a shaft base, a shaft body extending from one end of said shaft base;
    a spring member mounted on said shaft body of said shaft member and having a first end engaging said shaft base;
    a slide mounted on the shaft body of said shaft member for synchronous turning with said shaft member and engaging a second end of said spring member and pressing said spring member against said shaft base of said shaft member, said slide having a plurality of wedge blocks located on an end thereof, and a plurality of sliding grooves and sliding protrusions alternatively arranged around said shaft body of said shaft member, the sliding protrusions of said slide each having a peak;
    a mounting frame, said mounting frame comprising an angled frame bar and a mounting lug extending upwardly from an edge of said angled frame bar for mounting, said angled frame bar having a first end extending upwardly and an axle hole formed in the first end thereof and coupled to the shaft body of said shaft member;
    a locating member fastened to said angled frame bar of said mounting frame around said shaft body of said shaft member and abutted against said slide for turning with said mounting frame relative to said slide and said shaft member, said locating member having a plurality of wedge-shaped grooves located on one end thereof for receiving the wedge blocks of said slide, and a plurality of sliding grooves and sliding protrusions alternatively arranged around said shaft body of said shaft member for acting against the sliding protrusions and sliding grooves of said slide respectively; and
    an end cap fastened to said shaft body of said shaft member to secure said shaft member to said mounting frame for allowing turning of said mounting frame with said locating member relative to said slide and said shaft member;
    wherein when turning said mounting frame and said locating member relative to said slide and said shaft member within a first predetermined angle, said wedge-shaped grooves of said locating member corresponding to said wedge blocks of said slide, causing said mounting frame to be returned or positioning in a predetermined position; when turning said mounting frame and said locating member relative to said slide and said shaft member over said first predetermined angle, the sliding protrusions of said locating member are moved along the sliding protrusions of said slide, and said mounting frame is returned when the sliding protrusions of said locating member do not move over the peaks of the sliding protrusions of said slide; when the sliding protrusions of said locating member are moved over the peaks of the sliding protrusions of said slide, said mounting frame is automatically turned relative to said shaft member through an angle.

2. The hinge as claimed in claim 1, wherein said shaft body of said shaft member has a coupling tip axially extending from a front end thereof remote from said shaft base and a locating groove extending around the periphery of said coupling tip; said end cap has a split center coupling hole fastened to the locating groove of said coupling tip of said shaft body of said shaft member.

3. The hinge as claimed in claim 1, wherein said shaft base of said shaft member has at least one mounting hole for fastening to an external object with a respective fastening member; said mounting lug of said mounting frame has at least one mounting hole for fastening to an external object with a respective fastening member.

4. The hinge as claimed in claim 1, wherein said spring member is selected from one of a coil spring, a corrugated spring plate and a disk-like spring plate.

5. The hinge as claimed in claim 1, wherein said angled frame bar of said mounting frame has two pinholes at two sides of the axle hole; said locating member has two pins respectively fastened to the pinholes of said angled frame bar of said mounting frame.

6. The hinge as claimed in claim 1, wherein said angled frame bar of said mounting frame has a stop block; said shaft body of said shaft member is mounted with a stop member, said stop member having a stop portion for stopping against one of two distal ends of the stop block of said angled frame bar of said mounting frame to limit the turning angle of said mounting frame relative to said shaft member.

7. The hinge as claimed in claim 1, further comprising an actuating member fastened to the shaft body of said shaft member and turnable with said shaft member relative to said mounting frame, said actuating member having an actuating portion for trigging an external control device when said mounting frame is turned to a predetermined angle relative to said shaft member.

\* \* \* \* \*